(12) United States Patent
Freeman et al.

(10) Patent No.: US 10,052,938 B2
(45) Date of Patent: Aug. 21, 2018

(54) REINFORCEMENT PILLAR FOR A VEHICLE HAVING AN INTEGRATED HEATER DUCT

(71) Applicant: Ford Global Technologies, LLC, Dearborn, MI (US)

(72) Inventors: Michael James Freeman, Allen Park, MI (US); Richard Allen Bodey, Jr., Ypsilanti, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 144 days.

(21) Appl. No.: 15/352,134

(22) Filed: Nov. 15, 2016

(65) Prior Publication Data

US 2018/0134121 A1 May 17, 2018

(51) Int. Cl.
*B60N 99/00* (2006.01)
*B60H 1/24* (2006.01)
*B62D 25/04* (2006.01)
*B62D 25/20* (2006.01)

(52) U.S. Cl.
CPC ............. *B60H 1/243* (2013.01); *B60H 1/246* (2013.01); *B62D 25/04* (2013.01); *B62D 25/2036* (2013.01)

(58) Field of Classification Search
CPC ........ B60H 1/243; B60H 1/246; B62D 25/04; B62D 25/2036
See application file for complete search history.

(56) References Cited

U.S. PATENT DOCUMENTS

| 6,929,312 B2 | 8/2005 | Rich et al. |
| 8,128,161 B2 | 3/2012 | Yang et al. |
| 8,641,134 B2 | 2/2014 | Sawyer et al. |
| 9,139,235 B2 * | 9/2015 | Craig ................... B62D 25/025 |
| 2007/0123157 A1 | 5/2007 | Shah et al. |

FOREIGN PATENT DOCUMENTS

| JP | 2003175859 A * | 6/2003 | |
| WO | WO-2014021038 A1 * | 2/2014 | ............. B60H 1/243 |

* cited by examiner

*Primary Examiner* — Lori L Lyjak
(74) *Attorney, Agent, or Firm* — Jason C. Rogers; Brooks Kushman P.C.

(57) ABSTRACT

A reinforcement assembly for a structural pillar includes an upper reinforcement that extends over a top of a wheel house and first and second surfaces. An area extends between the first and second surfaces such that the area defines a substantial right triangle over the wheel house. A slot within the area is defined to allow a duct connected to a casing to extend through the upper reinforcement. The reinforcement assembly further includes a lower reinforcement attached to the first surface of the upper reinforcement. The lower reinforcement extends parallel to the wheel house and perpendicular to the floor such that a load path is established through the upper and lower reinforcements.

15 Claims, 2 Drawing Sheets

REINFORCEMENT PILLAR FOR A VEHICLE HAVING AN INTEGRATED HEATER DUCT

TECHNICAL FIELD

The present disclosure relates to reinforcement pillars for vehicles.

BACKGROUND

Packaging space within vehicles is important. Likewise, structural pillars are required to support the weight of the vehicle as well as to maintain rigidity of the vehicle. Current vehicle systems, such as a heating ventilation and air conditioning system, may require designing around the structural pillars such that the system is compatible with the pillar. These designs may reduce the available packaging space within the vehicle. Further, load path management through the structural pillar may be interrupted if the system design is incompatible with the available packaging space or structural pillar.

SUMMARY

A vehicle structural pillar includes an upper reinforcement partially extending over a wheel house, having first and second surfaces, and defining a slot within an area between the first and second surfaces such that a duct extends through the slot and over the wheel house. The vehicle structural pillar also includes a lower reinforcement attached to the upper reinforcement and disposed adjacent the wheel house, and perpendicular to and secured with the floor defining a load path through the reinforcements.

A vehicle includes a structural pillar having upper and lower reinforcements. The lower reinforcement attaches to the upper reinforcement to provide a load path over a wheel house. The upper reinforcement defines a slot between first and second surfaces. The vehicle further includes a heating ventilation and air conditioning system. The heating ventilation and air conditioning system includes a duct that extends between the first and second surfaces through the slot such that the duct extends around the wheel house, proximate the floor and adjacent to the lower reinforcement.

A reinforcement assembly for a structural pillar includes an upper reinforcement that extends over a top of a wheel house and first and second surfaces. An area extends between the first and second surfaces such that the area defines a substantial right triangle over the wheel house. A slot within the area is defined to allow a duct connected to a casing to extend through the upper reinforcement. The reinforcement assembly further includes a lower reinforcement attached to the first surface of the upper reinforcement. The lower reinforcement extends parallel to the wheel house and perpendicular to the floor such that a load path is established through the upper and lower reinforcements.

DETAILED DESCRIPTION

Embodiments of the present disclosure are described herein. It is to be understood, however, that the disclosed embodiments are merely examples and other embodiments may take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures may be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
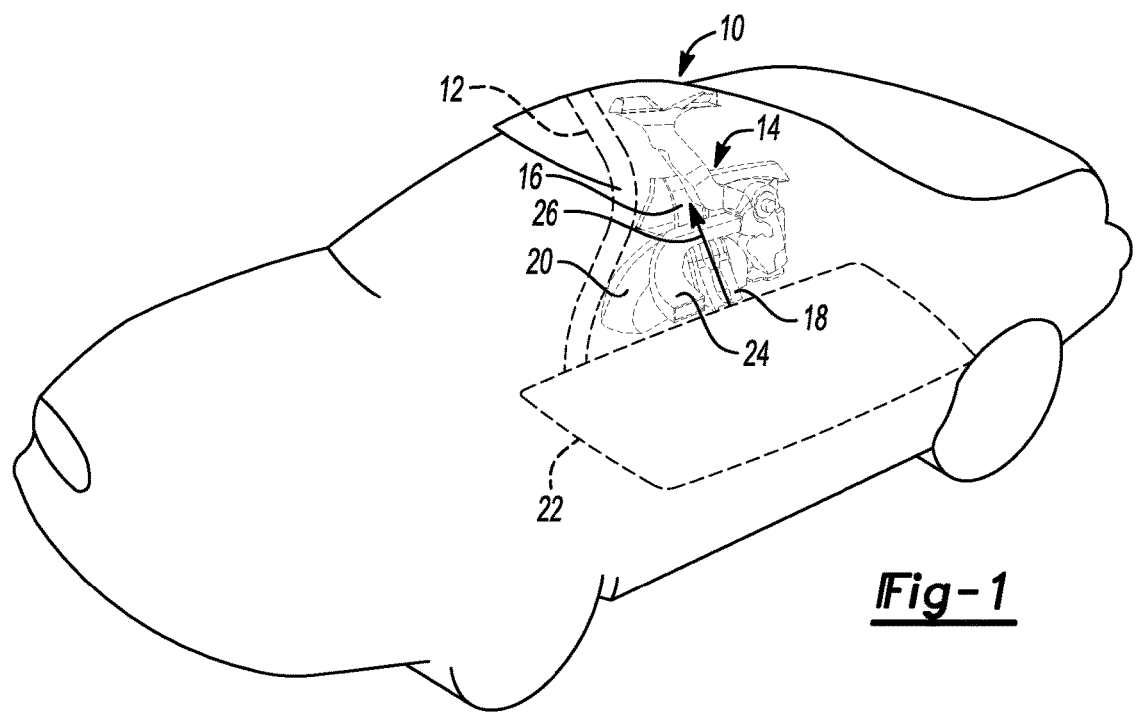
FIG. 1 is a perspective view of a vehicle having a structural pillar and HVAC system.

FIG. 1 depicts a perspective view of a vehicle 10. The vehicle 10 includes a structural pillar 12 and a heating ventilation and air conditioning (hereinafter referred to as "HVAC") system 14. The structural pillar 12 may further include an upper reinforcement 16 and a lower reinforcement 18. As can be seen in FIG. 1, the structural pillar 12 may intersect a wheel house 20 within the vehicle 10. Specifically, the upper reinforcement 16 may partially extend on the wheel house 20 and the lower reinforcement 18 may attach to the upper reinforcement 16 on the wheel house 20 and extend over the wheel house 20 to secure the structural pillar 12 to a floor 22 of the vehicle 10. Further, as will be described in more detail below, the HVAC system 14 may be disposed adjacent the wheel house 20 and further includes a duct 24 that extends in the direction of and through the structural pillar 12.

The upper and lower reinforcements 16, 18 improve the torsional stiffness and suspension equivalents stiffness of the structural pillar 12. The upper and lower reinforcements 16, 18 form a load path 26 over the wheel house 20 and through the structural pillar 12. The duct 24 may therefore interact with the upper reinforcement 16 to allow the upper and lower reinforcements 16, 18 to provide the load path management over the wheel house 20 and improve the torsional stiffness and suspension equivalents stiffness of the structural pillar 12, and still extend around the wheel house 20 to the floor 22. For example, the upper reinforcement 16 and the duct 24 may be configured to allow the duct 24 to extend through the upper reinforcement 16. Allowing the duct 24 to extend through the upper reinforcement 16 allows the duct 24 to extend past the wheel house 20 to the floor 22 without disrupting the load path 26 from the lower reinforcement 18 to the upper reinforcement 16 through the structural pillar 12.

Maintaining a rigid interaction between the upper reinforcement 16, the lower reinforcement 18 and the structural pillar 12 allows a load path 26 to be defined through the lower reinforcement 18, upper reinforcement 16 and structural pillar 12. Therefore, by extending the duct 24 through the upper reinforcement 16 to avoid interrupting the load path 26, as previously described, the upper and lower reinforcements 16, 18 aids to transfer load to the structural pillar 12. Transferring loads, via the load path 26, through the upper and lower reinforcements 16, 18 to the structural pillar 12 improve the torsional stiffness of the vehicle 10 and the suspension equivalents stiffness of the vehicle 10, as described above. Further, routing the duct 24 through the upper reinforcement 16 in a way that's compatible with the load path 26 provides an efficient use of the packaging space within the vehicle 10. For example, the duct 24 and the upper reinforcement 16 provide a unique way of extending the duct 24 over the wheel house 20 to the floor 22. Stated differently, the duct 24 may not require substantial redesign to provide heat to a rear area 28 of the vehicle 10.

Figure 2:
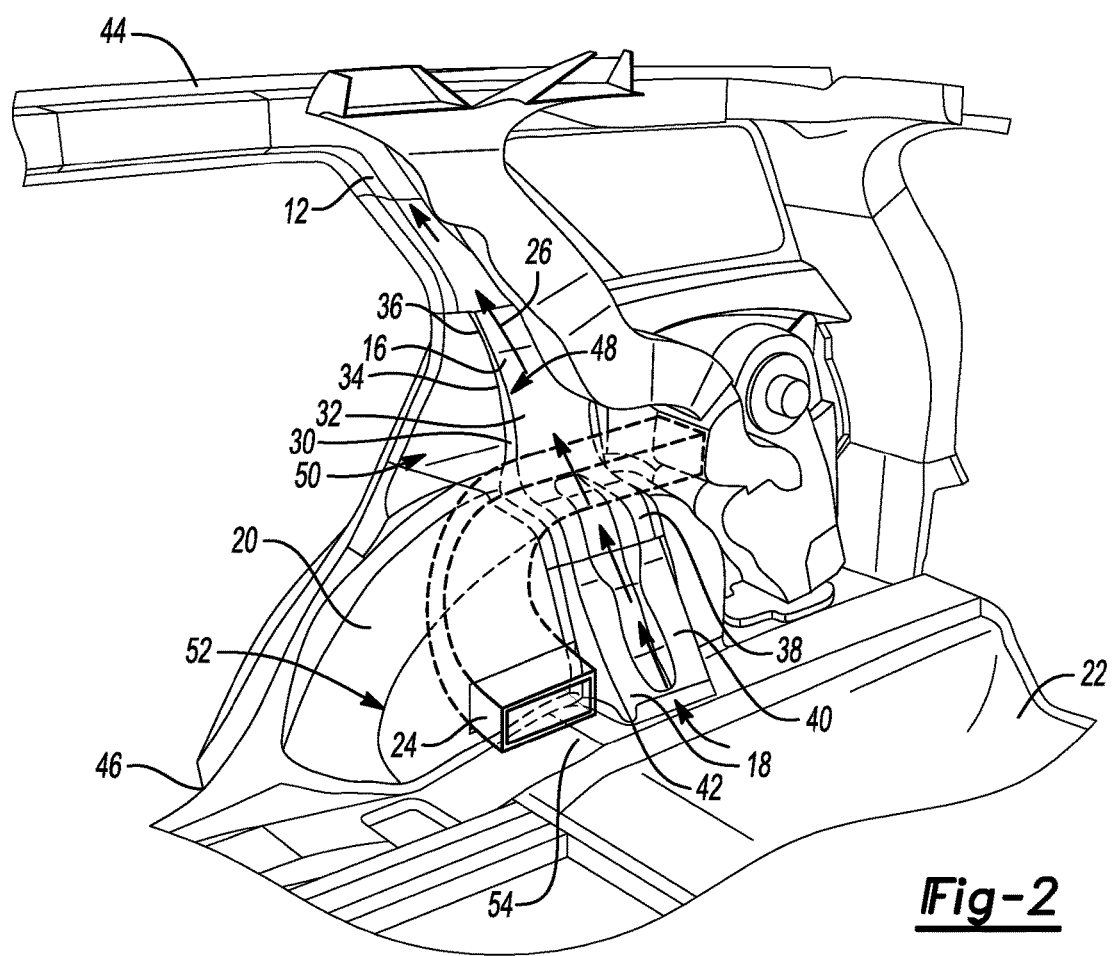
FIG. 2 is an inner perspective view of a rear structural pillar and HVAC casing.

FIG. 2 depicts a side perspective view of the structural pillar 12, the upper and lower reinforcements 16, 18 extending around the wheel house 20, and the duct 24 extending through the upper reinforcement 16. As can be seen in FIG. 2, the duct 24 of the HVAC system 14 may extend through the upper reinforcement 16 and curl across the wheel house 20 to be disposed adjacent the lower reinforcement 18 on the floor 22. The upper reinforcement 16 may define a slot 30 to receive the duct 24. The slot 30 may be defined between first and second surfaces 32, 34 of the upper reinforcement 16. The slot 30 may be sized according to the duct 24. For example, as depicted in FIG. 2, the duct 24 may define a substantially rectangular shape and therefore the slot 30 may also define a substantially rectangular shape in order to receive the duct 24 through the upper reinforcement 16. In at least one other embodiment, the slot 30 as well as the duct 24 may be substantially circular, square, triangular, or any other shape that allows the duct 24 to extend through the upper reinforcement 16 and curl around the wheel house 20.

The duct 24 may be a heating duct 24 of the HVAC system 14. Therefore, heat transfer may occur between the duct 24 and the first and second surfaces 32, 34 of the upper reinforcement 16. To avoid degradation to the upper reinforcement 16 due to the heat transfer through the duct 24 and the first and second surfaces 32, 34, the upper reinforcement 16 may be composed of an insulative material. In at least one other embodiment, the upper reinforcement 16 may be composed of any material, which does not degrade under high heat scenarios. For example, the upper reinforcement 16 may be composed of carbon fiber composite material. Carbon fiber composite material allows the upper reinforcement 16 to maintain structural rigidity between the first and second surfaces 32, 34 during heat transfer through the duct 24 as well as provide a light weight reinforcement to improve torsional stiffness of the structural pillar 12, as described above. In at least one other embodiment, the upper reinforcement 16 may be any material that maintains rigidity under heating conditions as well as provides light weight reinforcement to the structural pillar 12. In at least one other embodiment, the upper reinforcement 16 may also be configured to maintain structural rigidity between the first and second surfaces 32, 34 under cooling conditions.

As can be seen in FIG. 2, the lower reinforcement 18 attaches to the upper reinforcement 16 on the wheel house 20. The upper reinforcement 16 may extend partially over the wheel house 20 while the lower reinforcement 18 extends across an entirety of the wheel house 20 to the floor 22. The lower reinforcement 18 may be fastened to the upper reinforcement 16 using a plurality of bolts (not shown). In at least one other embodiment, the lower reinforcement 18 may be adhered, bonded, welded or fastened to the upper reinforcement 16 using any commonly known fastening technique. As stated above, the upper and lower reinforcements 16, 18 interconnect the structural pillar 12 with the floor 22 to define a load path 26 from the floor 22 to the structural pillar 12. Specifically, the load path 26 is defined from the floor 22 through the lower reinforcement 18 over the wheel house 20 to the upper reinforcement 16 and to the structural pillar 12. Therefore, the upper reinforcement 16 may also be attached to the structural pillar 12 at a first end 36.

The upper reinforcement 16 attaches to the structural pillar 12 at the first end 36 and to the lower reinforcement 18 at a second end 38. Likewise, the lower reinforcement 18 attaches to the upper reinforcement 16 at a first end 40 and attaches to the floor 22 at a second end 42. Again, the interconnection between the structural pillar 12 and the floor 22, via the upper and lower reinforcements 16, 18, allows the load path 26 to extend from a top 44 of the vehicle 10 to a bottom 46 of the vehicle 10 and thereby improving the torsional stiffness and suspension the equivalent stiffness of the vehicle 10.

As will be described in more detail below, the upper reinforcement 16 may define a contour 48 matching a contour 50 of the structural pillar 12 and a contour 52 of the wheel house 20. For example, the contour 50 of the structural pillar 12 may extend vertically toward the top 44 of the vehicle 10 and the contour 52 of the wheel house 20 may extend inwardly of the vehicle 10 as well as curve vertically toward the bottom 46 of the vehicle 10. Therefore, the upper reinforcement 16 may be formed to complement the contour 50 of the structural pillar and the contour 52 of the wheel house 20 and include at least two corners 54. Specifically, the second surface 34 of the upper reinforcement 16 may include at least two corners 54. The at least two corners 54 may be defined at the intersection between horizontal and vertical components of the upper reinforcement 16.

The at least two corners 54 may substantially define right angles. In at least one other embodiment, the at least two corners 54 may be defined within a range of 60-120 degrees. Further, the at least two corners 54 may also be complementary such that one of the corners 54 may be substantially convex and the other of the corners 54 may be substantially concave. Complementary corners 54, as described, allow the upper reinforcement 16 and specifically the second surface 34 of the upper reinforcement 16 to provide an interconnection between the structural pillar 12 and the floor 22 via the lower reinforcement 18. Again, as will be described in greater detail below, the first surface 32 may then extend across the corners 54 from the wheel house 20 to the structural pillar 12 in a substantially planar manner. For example, the first surface 32 may extend diagonally from the structural pillar 12 to the wheel house 20 extending straight and across the at least two corners 54. Therefore, the duct 24 may extend behind the first surface 32 and in front of the second surface 34 in the area defined by the contour 48 of the upper reinforcement 16.

Figure 3:
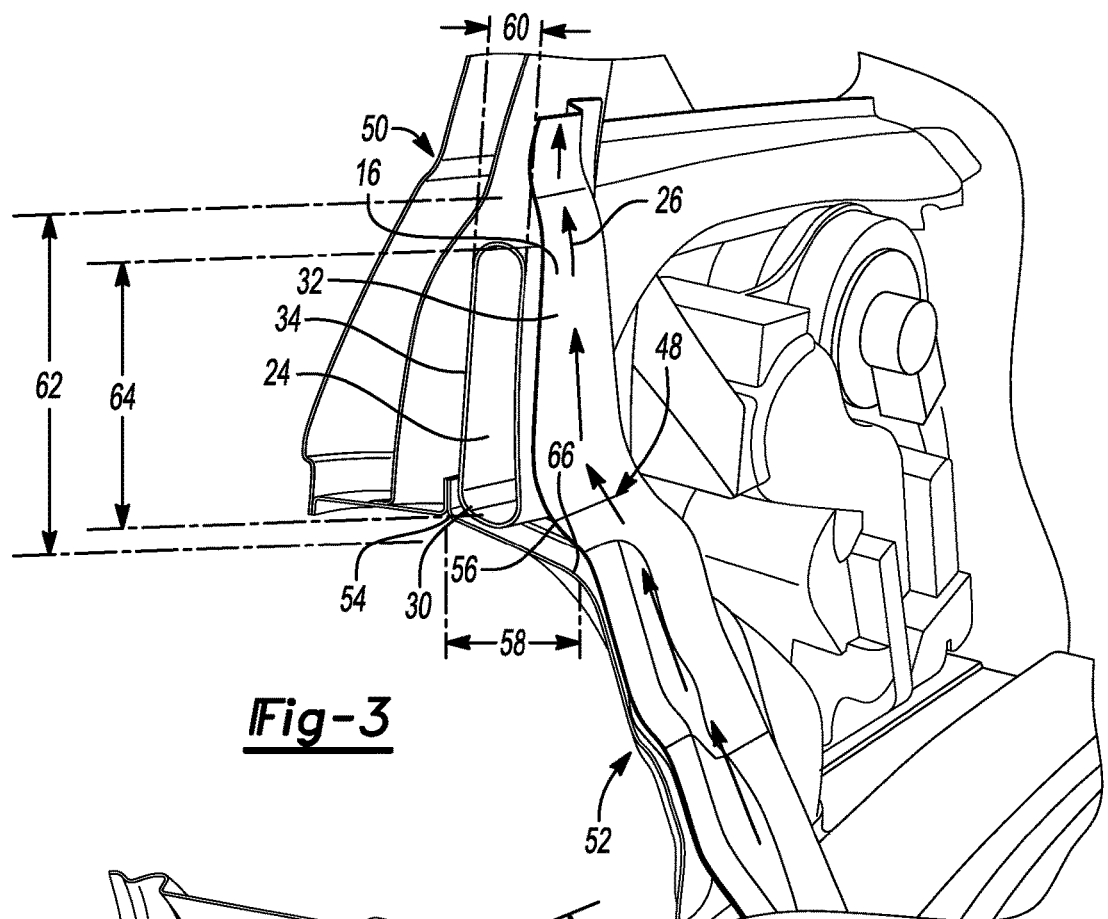
FIG. 3 is a partial side perspective view of a duct for the HVAC casing extending through the structural pillar.

Referring to FIG. 3, a partial side perspective view of the upper reinforcement 16 and the duct 24 extending between the first and second surfaces 32, 34 is depicted. For example, FIG. 3 depicts the rectangular shape of the duct 24 within the slot 30 through the upper reinforcement 16. The contour 48 of the upper reinforcement 16 as well as the at least two corners 54 and planar orientation of the first surface 32 are depicted in FIG. 3. As can be seen in FIG. 3, the duct 24 fits within an area 56 between the first and second surfaces 32, 34. The shape of the duct 24 and therefore the slot 30 is defined by the area 56 between the first and second surfaces 32, 34 of the upper reinforcement 16. For example, the at least two corners 54 may be spaced by a distance 58. The duct 24 may define a width 60 substantially equal to the distance 58. Likewise, the first surface 32 may extend diagonally across a plane intersecting the structural pillar 12 and the wheel house 20, which defines a height 62 within the area 56. The duct 24 may define a height 64 substantially equal to the height 62 within the area 56 defined by the planar orientation of the first surface 32. Again, the contour 48 of the upper reinforcement 16, via the area 56 defined between the first and second surfaces 32, 34, constrains the size and shape of the duct 24.

If the dimensions of the duct 24 are constrained by the contour 48 of the upper reinforcement 16 and specifically the area 56 defined between the first and second surfaces 32, 34 of the upper reinforcement 16, then the contour 48 and area 56 of the upper reinforcement 16 may be such that the duct 24 may be sized without restricting airflow through the duct 24. For example, the upper reinforcement 16 may be designed such that the area 56 between the first and second surfaces 32, 34 allows the duct 24 to have a sufficient width 60 and height 64 to provide enough airflow to meet the heating demands of the HVAC system 14. In this way, the contour 48 at the upper reinforcement 16 may be optimized depending on the airflow requirement of the heating demands of the HVAC system 14 and as such, the planar orientation of the first surface 32 may be adjusted based on airflow requirements of the HVAC system 14 and strength and rigidity requirements of the structural pillar 12 to provide improved torsional stiffness and suspension equivalent stiffness of the vehicle 10. However, since the second surface 34 includes the at least two corners 54 and is molded to match the contour 50 of the structural pillar 12 and the contour 52 of the wheel house 20, the orientation of the second surface 34 may be constrained by the contour 50 of the structural pillar and the contour 52 of the wheel house 20.

Therefore, to adjust the area 56 between the first and second surfaces 32, 34 in order to adapt the duct 24 for various airflow and heating requirements, the orientation of the first surface 32 may be adjusted by adjusting an angle 66 at the intersection of one of the corners 54 and the first surface 32. For example, to increase the area 56 between the first and second surfaces 32, 34, the angle 66 between the first surface 32 and one of the corners 54 may be increased. Increasing the angle 66 between the first surface 32 and one of the corners 54 may aid to increase the height 64 of the duct 24 and therefore the slot 30. In a similar manner, decreasing the angle 66 between the first surface 32 and one of the corners 54 decreases the area 56 between the first surface 32 and one of the corners 54, which will decrease the height 64 of the duct 24 and therefore the slot 30. Again, adjusting the angle 66 between the first surface 32 and one of the corners 54 may optimize the duct 24 to provide airflow sufficient to meet heating demands of the HVAC system. Similarly, the angle 66 between the first surface 32 and one of the corners may be optimized based on the rigidity requirements of the structural pillar 12.

For example, to focus support of upper reinforcement 16 closer to the wheel house 20 and increase the rigidity of the structural pillar 12 to meet torsional stiffness and suspension equivalents stiffness requirements closer to the wheel house 20, the angle 66 between the first surface 32 and one of the corners 54 may be decreased. Likewise, to focus support of the upper reinforcement 16 on the structural pillar 12 away from the wheel house 20 and increase the rigidity of the structural pillar 12 to meet torsional stiffness and suspension equivalent stiffness requirements on the structural pillar 12 away from the wheel house 20, the angle 66 between the first surface 32 and one of the corners 54 may be increased. Stated differently, the angle 66 between the first surface 32 and one of the corners 54 may be designed and optimized based on loading characteristics defined by the load paths 26 from the floor 22 through the upper and lower reinforcements 16, 18 to the structural pillar 12. Adjustment of the angle 66 based on loading characteristics of the load path 26 to improve the structural rigidity of the structural pillar 12 may be balanced by the airflow and heating requirements of the duct 24 described above. The angle 66 between the first surface 32 and one of the corners 54 may be designed such that the upper reinforcement 16 improves the structural rigidity of the structural pillar 12 and allow sufficient airflow through the duct 24 to meet heating requirements of the HVAC system 14.

Figure 4:
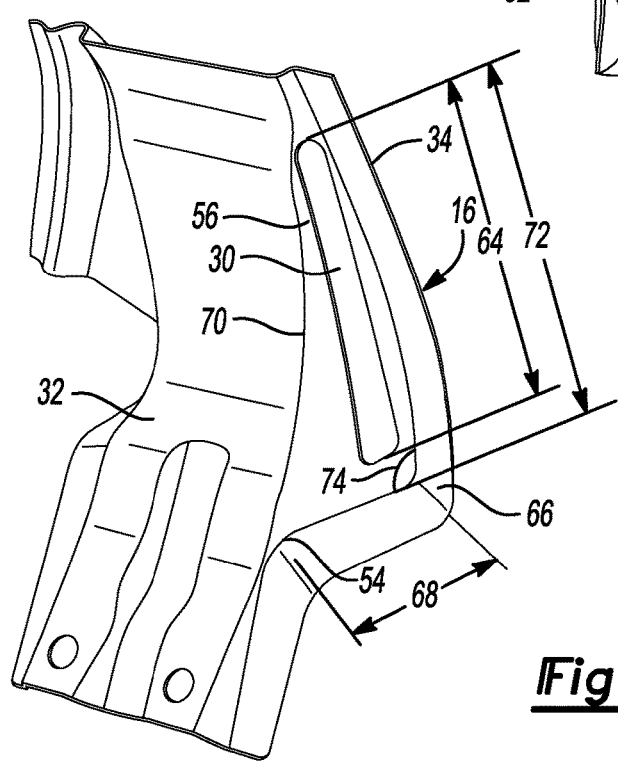
FIG. 4 is a perspective view of an upper reinforcement for the structural member.

FIG. 4 depicts a perspective view of an embodiment of the upper reinforcement 16 and the angle 66 between the first surface and one of the corners 54. As can be seen in FIG. 4, the area 56 defined between the first and second surfaces 32, 34 may also be substantially triangular. The distance 58 between each of the corners may be a base 68 of the triangular area 56, the first surface 32 may be a hypotenuse 70 of the triangular area 56 and the height 64 may be a height 72 of the triangular area 56. As described above, the corners 54 may define substantially right angles relative to the wheel house 20. Therefore, at least one of the at least two corners 54 may be near perpendicular to form an angle 74 between the base 68 of triangular area 56 and the height 72 of the triangular area 56. The triangular area 56 may be a right triangular area 56 commonly understood in geometry to be a right triangle. Forming a substantial right triangle further aids the upper reinforcement 16 in providing structural rigidity to the structural pillar 12.

Using this geometry, in which the planar orientation of the first surface 32 acts as a hypotenuse 70 of the triangular area 56, the upper reinforcement 16 allows for an optimum amount of support through the structural pillar 12 as well as maintaining design adjustments of the angle 66 between 30° and 45°. The load path 26 is directed across the first surface 32 of the upper reinforcement 16 and therefore across the hypotenuse 70 of the triangular area 56. Directing the load path 26 across the first surface 32 forces the load path 26 to travel across the upper reinforcement 16 having the greatest distance to the structural pillar 12 and therefore distributes the load across the most rigid portion of the upper reinforcement 16. For example, the first surface 32 acting as the hypotenuse 70 the triangular area 56 acts to improve the torsional stiffness of the vehicle 10 when the vehicle is turning a corner by aiding to support the structural pillar 12 and stiffen the shock mounts (not shown) across the load path 26.

Also, by using a triangular area 56, the upper reinforcement 16 provides an optimal amount of support using a small amount of packaging space within the vehicle 10. Therefore, the triangular area 56 defined between the first and second surfaces 32, 34 of the upper reinforcement 16 further aids to improve the torsional stiffness and the suspension equivalent stiffness through the structural pillar 12 of the vehicle 10 using an efficient orientation and size while allowing the duct 24 to meet heating and cooling requirements of the HVAC system 14 without interference or redesign.

While exemplary embodiments are described above, it is not intended that these embodiments describe all possible forms encompassed by the claims. The words used in the specification are words of description rather than limitation, and it is understood that various changes may be made without departing from the spirit and scope of the disclosure. As previously described, the features of various embodiments may be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics may be compromised to achieve desired overall system attributes, which depend on the specific application and implementation. These attributes may include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and may be desirable for particular applications.

What is claimed is:

1. A vehicle structural pillar comprising:
    an upper reinforcement partially extending over a wheel house, having first and second surfaces, and defining a slot within an area between the first and second surfaces such that a duct extends through the slot and over the wheel house; and
    a lower reinforcement attached to the upper reinforcement and disposed adjacent the wheel house, and perpendicular to and secured with a floor defining a load path through the reinforcements.

2. The vehicle structural pillar of claim 1, wherein the duct is composed of a heat resistant polymer.

3. The vehicle structural pillar of claim 1, wherein the duct is composed of a carbon fiber composite.

4. The vehicle structural pillar of claim 1, wherein the lower reinforcement is welded to the upper reinforcement.

5. The vehicle structural pillar of claim 1, wherein the first surface of the upper reinforcement interconnects to the second surface at an angle to increase stiffness.

6. A vehicle comprising:
    a structural pillar having upper and lower reinforcements, wherein the lower reinforcement attaches to the upper reinforcement to provide a load path over a wheel house and the upper reinforcement defines a slot between first and second surfaces; and
    a heating ventilation and air conditioning system, including a duct that extends between the first and second surfaces through the slot such that the duct extends around the wheel house, proximate a floor and adjacent to the lower reinforcement.

7. The vehicle of claim 6, wherein the slot is defined within an area between the first and second surfaces.

8. The vehicle of claim 7, wherein the area defines a substantially triangular shape.

9. The vehicle of claim 8, wherein the triangular shape of the area forms a right triangle.

10. The vehicle of claim 9, wherein the first surface of the upper reinforcement defines a hypotenuse of the right triangle.

11. A reinforcement assembly for a structural pillar comprising:
    an upper reinforcement that extends over a top of a wheel house and includes first and second surfaces, wherein an area extends between the first and second surfaces such that the area defines a substantial right triangle over the wheel house, and defines a slot within the area defined to allow a duct connected to a casing to extend through the upper reinforcement; and
    a lower reinforcement attached to the first surface of the upper reinforcement and extending parallel to the wheel house and perpendicular to a floor such that a load path is established through the upper and lower reinforcements.

12. The reinforcement assembly of claim 11, wherein the slot defines a rectangular shape.

13. The reinforcement assembly of claim 11, wherein the upper reinforcement further includes at least two corners such that the area forms the substantial right triangle.

14. The reinforcement assembly of claim 11, wherein the first surface of the upper reinforcement defines a hypotenuse of the right triangle.

15. The reinforcement assembly of claim 11, wherein the substantial right triangle is further defined by at least corners having angles within a range of 60 to 120 degrees.

* * * * *